US007269582B2

(12) United States Patent
Winter et al.

(10) Patent No.: US 7,269,582 B2
(45) Date of Patent: Sep. 11, 2007

(54) DATABASE MODEL FOR HIERARCHICAL DATA FORMATS

(75) Inventors: Marco Winter, Hannover (DE); Hartmut Peters, Barsinghausen (DE); Meinolf Blawat, Hannover (DE); Ralf Ostermann, Hannover (DE); Dietmar Hepper, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 39 days.

(21) Appl. No.: 10/819,750

(22) Filed: Apr. 7, 2004

(65) Prior Publication Data

US 2004/0199547 A1 Oct. 7, 2004

(30) Foreign Application Priority Data

Apr. 7, 2003 (EP) .................................. 03007880

(51) Int. Cl.
G06F 17/30 (2006.01)
G06F 17/00 (2006.01)
(52) U.S. Cl. .............................. 707/1; 707/3; 707/200
(58) Field of Classification Search .................. 707/1, 707/3, 6, 200, 203, 204
See application file for complete search history.

(56) References Cited

U.S. PATENT DOCUMENTS

| 6,418,448 | B1 | 7/2002 | Sarkar |
| 6,611,835 | B1* | 8/2003 | Huang et al. ................. 707/10 |
| 6,847,977 | B2* | 1/2005 | Abajian ....................... 707/102 |
| 6,882,825 | B2* | 4/2005 | Hopkins et al. ............. 434/350 |
| 2002/0103781 | A1* | 8/2002 | Mori et al. ..................... 707/1 |
| 2004/0199657 | A1* | 10/2004 | Eyal et al. .................. 709/231 |
| 2005/0132003 | A1* | 6/2005 | Philyaw ........................ 709/204 |

OTHER PUBLICATIONS

Bray, "Namespaces Hate Validation", Internet Article, 'Online!, Jan. 6, 1999.
Bray et al., "Namespaces in XML", W3C, 'Online!, Jan. 14, 1999.
Patton, "Use Namespaces to Differentiate your XML", Internet Article 'Online!, Nov. 20, 2002.
Florescu et al., "A Performance Evaluation of Alternative Mapping Schemes for Storing XML Data in a Relational Database", INRIA Technical Report, 'Online!, No. 3680, May 1999, Le Chesnay, France.
Search Report for EPO Appln. No. 03007880 dated Jul. 28, 2003.

* cited by examiner

*Primary Examiner*—Sam Rimell
(74) *Attorney, Agent, or Firm*—Joseph J. Laks; Robert D. Shedd; Reitseng Lin (57) ABSTRACT

The present invention relates to a method for ensuring data consistency upon mapping of a hierarchical data format to a relational database management system.

According to the invention, a method for ensuring data consistency upon storage of a data item in a database, the data item having an identifier and a locator for linking the data item to a destination, whereby the identifier and the locator are stored in the database in addition to the data item, comprises the steps of:
checking (11) whether the current combination of identifier and locator has already been stored in the database, and using (12) the stored combination of the data item if this is the case,
in case the current combination of identifier and locator has not yet been stored in the database, checking (13, 15) whether either the identifier or the locator has already been stored in the database, replacing (14, 16) the current combination of identifier and locator with a univocal combination if this is the case, and storing (17) the univocal combination together with the data item, and
storing (17) the current combination of identifier and locator together with the data item else.

16 Claims, 5 Drawing Sheets

```
<MetaDataStream
    xmlns="http://www.thomson.net/research/MetaDataStream"
    xmlns:assi=...>

<MetaDataDescriptor ....
    ....
    </MetaDataDescriptor>

<MetaDataDescriptor ....
    ....
    </MetaDataDescriptor>
        ⋮
    <MetaDataDescriptor ...
    ....
    </MetaDataDescriptor>

</MetaDataStream>
```

Fig. 1

```
<MetaDataDescriptor
    xmlns="http://www.thomson.net/MetaDataStream"
    xmlns:link="http://www.thomson.net/MetaDataStream/LinkDescriptor"
    xmlns:log="http://www.thomson.net/MetaDataStream/LogEntry"
    xmlns:info="http://www.thomson.net/MetaDataStream/Info"
    xmlns:xml="http://www.w3.org/XML/1998/namespace">

<log:LogEntry UUID="351f687f-fdfa-4050-9c59-bb513bc87845"
                  DateTime="2002-02-06T14:41:49+01:00"
                  Action="Create" />

<link:ContentReference>
        <link:Link>
            <link:LinkingTo>
                <log:LogEntryReference type="UUID"
                                      href="cc80b1fd-e070-48ad-90c8-82ed5d1526da"/>
                <link:DvrClpiParameter>
                    <link:STC_seq>0</link:STC_seq>
                    <link:PTS>1319433744</link:PTS>
                </link:DvrClpiParameter>
            </link:LinkingTo>
        </link:Link>
        <link:Origin>
            <log:LogEntryReference type="UUID"
                                   href="34583cd2-f360-4f0b-b011-885953e20c80" />
        </link:Origin>
    </link:ContentReference>

<core:Core-MD
        xmlns:th="http://www.thomson.net/MetaDataStream/CoreMD">
        ...
    </core>
</MetaDataDescriptor>
```

Labels: 2 (MetaDataDescriptor), 4 (xmlns block), 5 (LogEntry UUID), 6 (ContentReference block), 7 (Core-MD block)

Fig. 2 a)
```
1  <sectionStart mw="http://mw-homepage/mw-namespaces">
2    <mw:title> Titanic </mw:title>
5    <th:section>
6      <mw:title> 5555 Hello 6666 </mw:title>
9      <th:section>
10       <mw:title mw:arrow="down"> 333 </mw:title>
15     </th:section>
16   </th:section>
17 </sectionStart>
```
7 b)

Fig. 3

| Primary Key | | Secondary Key | | | | |
|---|---|---|---|---|---|---|
| Descr# | Word Pos. | Type | Descr. Key | Level | Name-space | Next Upper Word Pos. |
| 123 | 1 | Element | 1 | 0 | 0 | 1 |
| 123 | 2 | Element | 3 | 1 | 2 | 1 |
| 123 | 3 | String | 1 | 2 | 0 | 2 |
| 123 | 5 | Element | 2 | 1 | 1 | 1 |
| 123 | 6 | Element | 3 | 2 | 2 | 5 |
| 123 | 7 | String | 2 | 3 | 0 | 6 |
| 123 | 9 | Element | 2 | 2 | 1 | 5 |
| 123 | 10 | Element | 3 | 3 | 2 | 9 |
| 123 | 11 | Attribute | 1 | 4 | 2 | 10 |
| 123 | 12 | String | 3 | 4 | 0 | 11 |
| 123 | 13 | String | 4 | 4 | 0 | 10 |
| 123 | 14 | Namespace | 1 | 1 | - | 1 |
| 123 | 15 | Namespace | 2 | 1 | - | 1 |

| Element | Descr. Key |
|---|---|
| sectionStart | 1 |
| section | 2 |
| title | 3 |

| String | Descr. Key |
|---|---|
| Titanic | 1 |
| 5555 Hello 6666 | 2 |
| down | 3 |
| 333 | 4 |

| Attribute | Descr. Key |
|---|---|
| arrow | 1 |

| Prefix | Descr. Key |
|---|---|
| - | 0 |
| th | 1 |
| mw | 2 |

| URI | Descr. Key |
|---|---|
| -- no namespace URI -- | 0 |
| "http://www.thomson.net/MetaDataStream/CoreMD" | 1 |
| "http://mw-homepage/mw-namespaces" | 2 |

DATABASE MODEL FOR HIERARCHICAL DATA FORMATS

FIELD OF THE INVENTION

The present invention relates to a method for ensuring data consistency upon mapping of a hierarchical data format to a relational database management system. Furthermore, the present invention relates to an apparatus for reading from and/or writing to recording media using such method.

BACKGROUND OF THE INVENTION

The future of digital recording will be characterised by the preparation, presentation and archiving of added value data services, i.e. a recorder, like a DVR (Digital Video Recorder) for example, will store and handle additional information delivered by content providers like broadcasters or special services or even assembled by the user himself. Added value (metadata) is generated to give further information to the user. For example, added value may be a movie summary explaining the story, a listing of the actors etc. Also the provision of additional information facilitating navigation inside the movie constitutes added value. For example, a movie can be structured into sections, subsections etc. each having an individual title and possibly comprising further useful information.

For providing structural information and for transporting other metadata for multimedia objects like video or audio streams, an hierarchical data format is generally used. A well-known and widely accepted hierarchical data format is the extensible markup language XML. XML is a system for defining specialized markup languages that are used for transmitting formatted data. It is, therefore, also called a meta language, a language used for creating other specialized languages. XML data consists of text, which is organised in form of a plurality of descriptors. The text itself contains elements, attributes and content, i.e. the remaining text. Besides the use for multimedia objects, many other applications for XML are known.

It is to be expected that in the foreseeable future digital recorders will store quite a large amount of data in XML or another hierarchical data format in relational databases, since these databases are widely used and quite sophisticated. For storage the hierarchical data format has to be mapped to a relational database management system (RDBMS). Therefore, a method for mapping a hierarchical data format comprising descriptors to a relational database management system has been proposed in the co-pending European patent application 02017045.2. According to this method the descriptors are separated into portions of a common format, which are stored in relations in the relational database. The database model will be explained later on with reference to FIG. 4.

In XML a single document may contain elements and attributes that are defined for and used by multiple software modules. For such documents recognition and possible collisions have to be considered. The software modules need to recognize the elements and attributes, which they have to process, even if collisions occur when the same elements types or attribute names have been defined differently for another software module. This requires that the elements and attributes should have universal names with a scope extending beyond their containing document. For this purpose namespaces are used in XML. An XML namespace is a collection of names identified by a locator, i.e. a universal resource identifier (URI). For an unambiguous identification elements and attributes within the document are provided with a prefix. The prefix is separated from the element or attribute to which it refers by a separator, e.g. mw:author (prefix="mw", separator=":", element name="author"). Before such a prefix may be used, it has to be defined in the XML document:

<Section xmlns:mw="http://www.mw-homepage/mws-namespaces">
  <mw:author>Winter et al.</mw:author>
</Section>

In this example the namespace declaration is initiated by the tag "xmlns", followed by the separator ":" and the URI "http://www.mw-homepage/mws-namespaces". However, since the prefixes may be chosen freely by anybody, with only a small number of constraints, conflicting definitions are likely to occur:

<Section xmlns:mw="http://www.mw-homepage/mws-namespaces">
  <mw:title>Namespaces</mw:section>
/Section>
<Chapter xmlns:mw="http://www.another-mw-homepage/XML/ns">
  <mw:section>Section 1</mw:section>
</Chapter>

In the above example two different locators are used with the same prefix. If both definitions were stored in a database the data in the database would be inconsistent.

SUMMARY OF THE INVENTION

It is an object of the present invention to improve the methods for storing data in a hierarchical data format in a relational database known from Prior Art.

According to the invention, a method for ensuring data consistency upon storage of a data item in a database, the data item having an identifier and a locator for linking the data item to a destination, whereby the identifier and the locator are stored in the database in addition to the data item, comprises the steps of:

checking whether the current combination of identifier and locator has already been stored in the database, and using the stored combination of the data item if this is the case,   in case the current combination of identifier and locator has not yet been stored in the database, checking whether either the identifier or the locator has already been stored in the database, replacing the current combination of identifier and locator with a univocal combination if this is the case, and storing the univocal combination together with the data item, and   storing the current combination of identifier and locator together with the data item else.

Favourably, the identifier and the locator are stored separately from the data item in the database. Before storage it is checked whether the combination of identifier and locator has already been used and stored before. If this is the case, this combination can be used without constraints. If, however, either the identifier or the locator has already been used and stored in the database in a different combination, the storage of the current combination would lead to inconsistent data. Therefore, in this case the current combination is replaced by a univocal combination of identifier and locator, which is then stored in the database. If neither the identifier nor the locator has previously been stored in the database, the current combination of identifier and locator is stored in addition to the data item. The method has the advantage that data consistency is ensured by preventing that a single identifier is stored with more than one locator in the database. Each identifier is related to a single, univocal locator.

Favourably, the replacing step comprises:
  in case the identifier has previously been stored in combination with a different locator, replacing the identifier with a univocal identifier not yet stored in the database, and
  in case the locator has previously been stored in combination with a different identifier, replacing the identifier with the previously stored identifier.

If the identifier has already been stored in combination with a different locator, it is sufficient to replace the identifier with a new identifier, which has not yet been stored in the database. If, however, the locator has already been stored in combination with a different identifier, the identifier is advantageously replaced with the previously stored identifier. Though the latter is not absolutely necessary to ensure data consistency, it helps to prevent repetitions inside the database and, therefore, to reduce the amount of data which has to be stored in the database.

Favourably, the data items are words of an hierarchical data format. Examples for such words are elements and attributes. Hierarchical data formats are generally used for providing structural information and for transporting other metadata for multimedia objects. The method would, therefore, be widely applicable to multimedia applications. However, the method is not limited to hierarchical data formats and can also be applied to other data formats.

Advantageously the hierarchical data format is the extensible markup language XML. XML is a well known and widely accepted hierarchical data format, consisting of text, which is organized in form of descriptors. In this way the method is applicable to any type of multimedia object comprising metadata in form of XML descriptors. Since XML is a well specified markup language derived from SGML, the Standard Generalized Markup Language [ISO 8879], XML descriptors follow predefined rules and no unexpected data or conditions occur.

Advantageously, the combination of identifier and locator is a namespace declaration. Namespaces are an important feature of the extensible markup language. They allow to define different meanings for the same elements and attributes, or to define additional elements and attributes. To avoid collisions between different documents in a database, a database capable of storing XML descriptors advantageously provides a method for handling namespaces.

Favourably, the locator is a Uniform Resource Identifier URI. Uniform Resource Identifiers are a well known and established concept for pointing to defined destinations. Of course, other types of locators such as Uniform Resource Locators (URL) or Uniform Resource Names (URN), can also be used.

Advantageously, the identifier is a prefix. A prefix is a very easy and comfortable way for characterizing an element or attribute as being defined by rules which are related to and identified by the prefix. Usually the prefix is separated from the element or attribute to which it refers by a separator, such as ":". Favourably, the prefix can be chosen freely with only a limited number of constraints. Possible constraints could be, for example, special reserved prefixes related to standard definitions, forbidden characters, and upper or lower limits for the length of a prefix.

Favourably, the data items, the identifiers, and the locators are stored in a relational database. These databases are widely used and quite sophisticated. They allow easy manipulation and fast searching of data. Of course, the invention is not limited to relational databases. It can also be applied to other types of database.

Advantageously, a device for reading from and/or writing to recording media uses a method according to the invention for ensuring data consistency upon storage of a data item in a database. As mentioned before, future digital recorders will store quite a large amount of data in an hierarchical data format in relational databases. Since presumably the hierarchical data format will comprise namespaces or a similar concept, these digital recorders are favourably capable of handling identifiers and locators.

BRIEF DESCRIPTION OF THE DRAWINGS

For a better understanding of the invention, exemplary embodiments are specified in the following description of advantageous embodiments with reference to the figures, using XML as an example for an hierarchical data format. It is understood that the invention is not limited to these exemplary embodiments and that specified features can also expediently be combined and/or modified without departing from the scope of the present invention. In the figures.

DETAILED DESCRIPTION OF PREFERRED EMBODIMENTS

Figure 1:
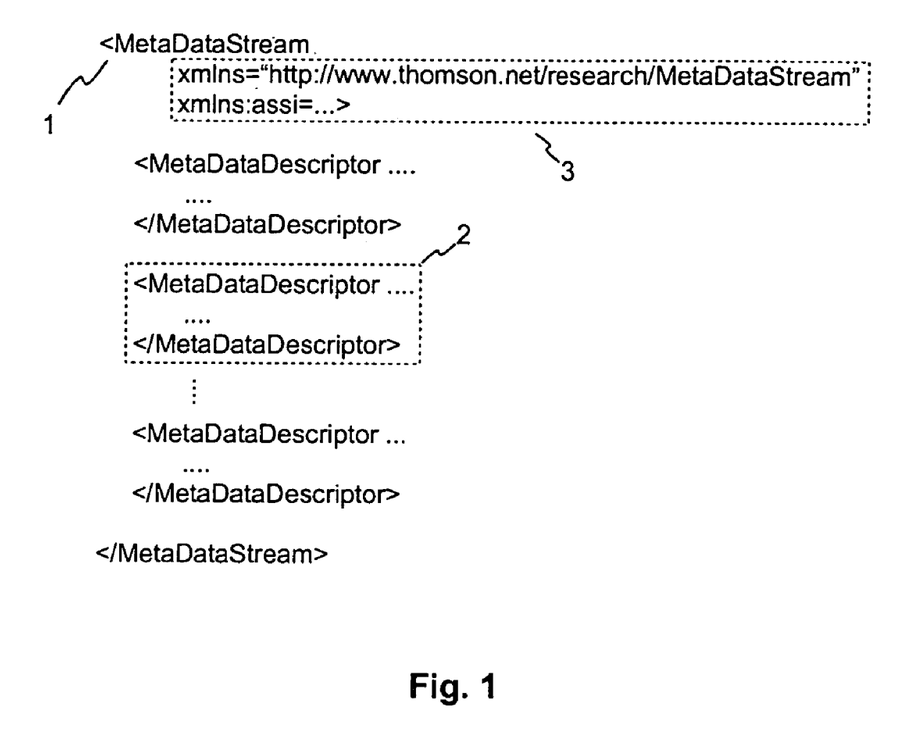
FIG. 1 shows a metadata stream comprising a plurality of metadata descriptors.

FIG. 1 depicts a metadata stream 1 comprising a plurality of metadata descriptors 2, which will be explained in more detail later on with reference to FIG. 2. In addition to the metadata descriptors 2, the metadata stream 1 comprises namespace declarations 3, which are valid for all metadata descriptors 2 within the specific metadata stream 1.

Figure 2:
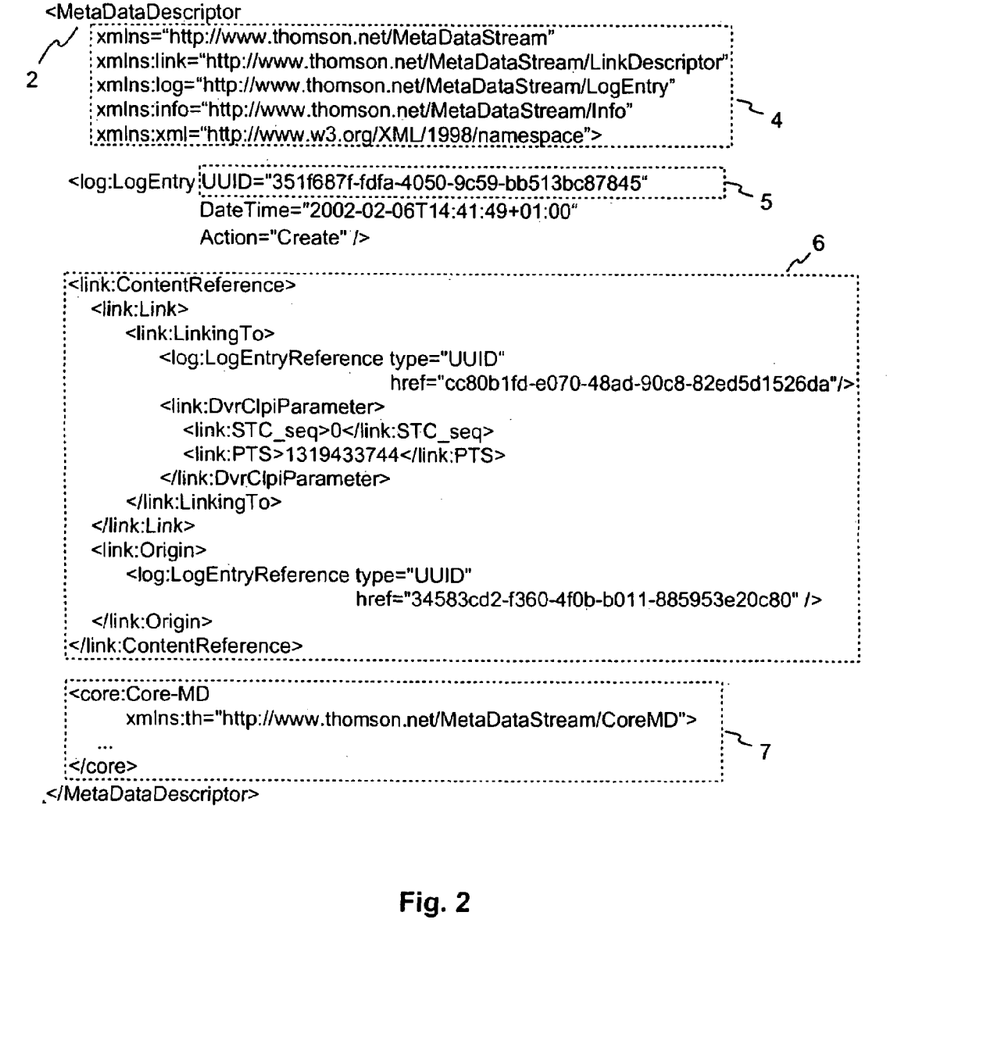
FIG. 2 shows a typical metadata descriptor comprising namespace information, a unique identifier and links to other metadata descriptors.

FIG. 2 shows a typical metadata descriptor 2. The actual content of the metadata descriptor is contained in the core 7. In addition, the metadata descriptor 2 comprises namespace declarations 4, a unique identifier 5 and links 6 to other metadata descriptors. The unique identifier 5 allows an unambiguous identification of the metadata descriptor 2. In this example, the namespace declarations 4 declare a prefix "th" with a corresponding uniform resource identifier (URI) "http://www.thomson.net/MetaDatastream/CoreMD", i.e. an identifier pointing to a location where metadata words are defined. The namespace declarations 4 are only valid for the specific metadata descriptor 2. The namespace declarations 4 are not limited to a single declaration. It is well possible to define a plurality of declarations with unique prefixes. Different prefixes are usually linked to different URI references, however, it is also possible to link several prefixes to the same URI. URI references are generally considered identical when they are the same character for character. References which are not identical in this sense may still be functionally equivalent. Every metadata word contained in the core 7 is marked with one of the prefixes to indicate that it is to be understood as defined in the respective URI. In case a word is not provided with a prefix, the general definition as given by the namespace declarations 3 of the metadata stream 1 applies.

Figure 3:
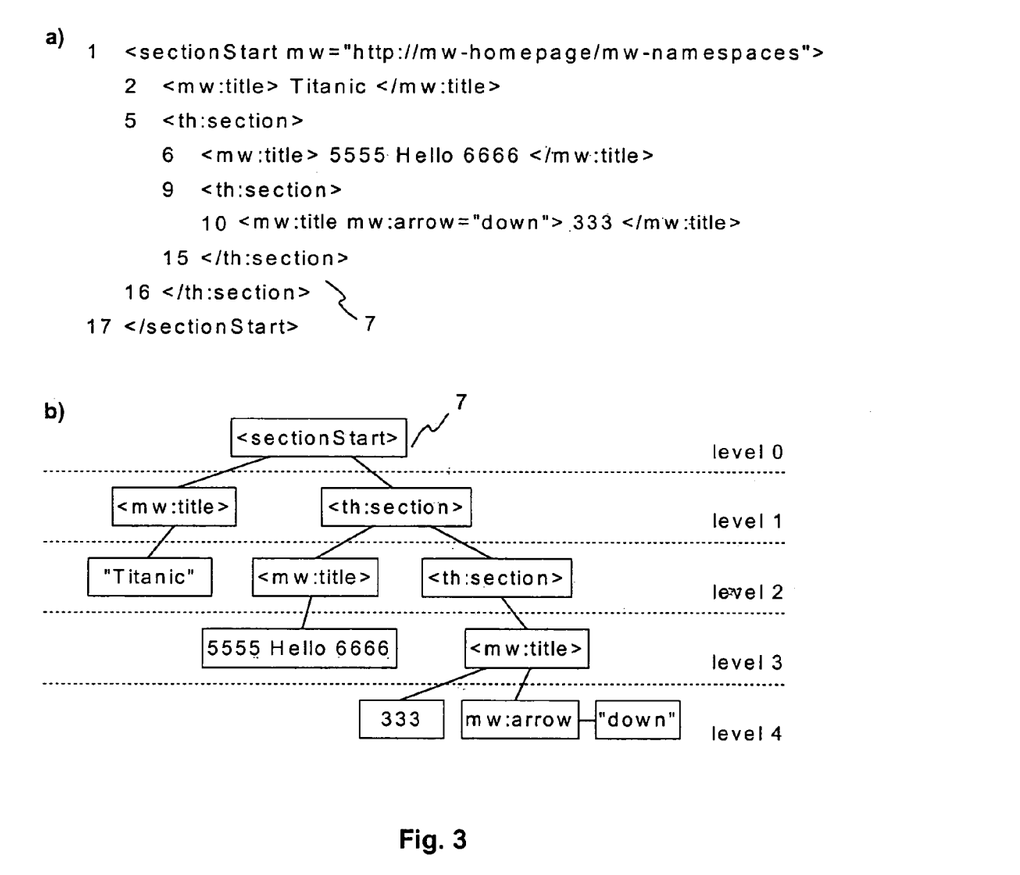
FIG. 3a, 3b show a simplified XML descriptor comprising namespace information and its representation as an XML tree.

FIG. 3 shows in part a) a simplified example of the core 7 of an XML descriptor 2 and in part b) the corresponding representation as an XML tree. As can be seen from the figure, the exemplary core 7 of the descriptor 2 comprises a level-0 sectionStart, a level-1 section and a level-2 section, each having a title. The title of the level-2 section has an attribute "arrow" with the value "down". The core 7 of the descriptor 2 consists of a total of 17 words, wherein the text of each title counts as a single word, independent of the actual number of words. For example, "5555 Hello 6666" is a single "logical" word, though it comprises three "actual" words. The number given in each line of the core 7 of the descriptor 2 in part a) of the figure is the relative word position of the first word of each line within the core 7. From the corresponding tree structure in part B of the figure, it can be seen that the core 7 has five levels, namely level 0 to level 4. The tree structure is a helpful tool for illustrating the hierarchical relations between the different words of the core 7 of the descriptor 2.

The word "sectionStart" comprises a further namespace declaration, which declares a prefix "mw" with a corresponding URI "http://mw-homepage/mw-namespaces". Together with the prefix "th" the prefix "mw" is used for distinguishing the different words (section, title, arrow, . . . ) in accordance with the origin of their definition. In other words, the prefix "th" indicates that the subsequent word is to be understood as defined in "http://www.thomson.net/MetaDataStream/CoreMD", while the prefix "mw" indicates that the subsequent word is to be understood as defined in "http://mw-homepage/mw-namespaces".

Figure 4:
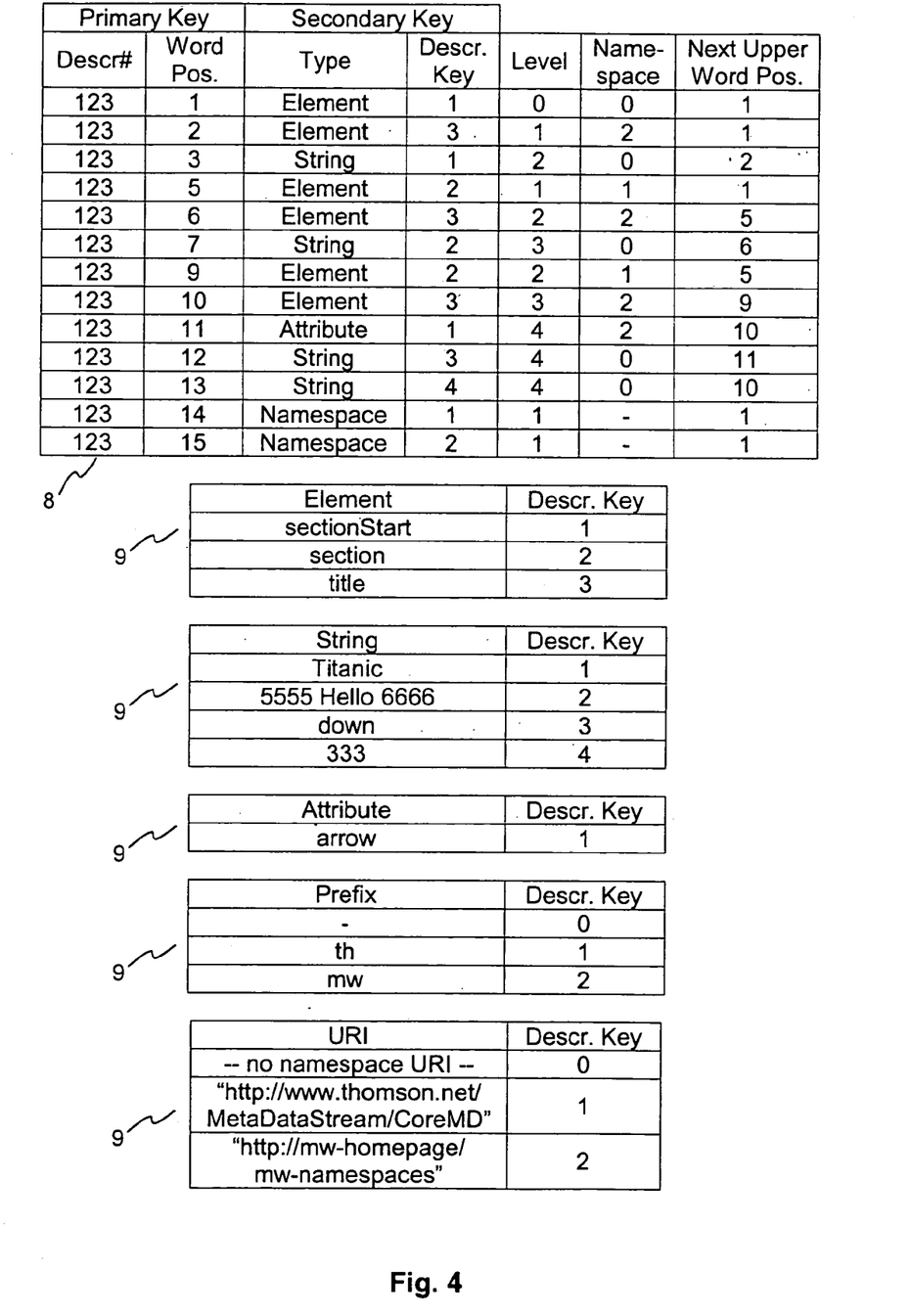
FIG. 4 shows a database model for mapping a hierarchical data format to a relational database, wherein elements, attributes, integer values, string values, prefixes, and namespaces are separated into different relations.

In FIG. 4 a database model for mapping a hierarchical data format to a relational database as disclosed in the co-pending European patent application 20117045.2 is shown. The database model uses a primary relation 8 and five secondary relations 9, which are represented by corresponding tables. The primary relation 8 comprises structural information about the metadata descriptor 2, while in the secondary relations 9 the values of the different types of metadata words are stored. This allows to avoid repetitions inside the relations 8, 9. In the example, the XML words are separated into the types "Element", "String", "Attribute", "Prefix", and "Namespace". Of course, other types can also be used, e.g. "Integer" etc.

The first column of the primary relation 8, "Descr#", indicates the univocal descriptor number inside the database management system. The second column, "Word Pos.", contains the relative position of the stored word within the specific descriptor 2. "Descr#" and "Word Pos." taken together are a primary key of the relation 8, allowing the complete recovery of a descriptor 2. The type of the XML words is inclusively stored in the relation 8 in the column "Type". For each XML word besides the value "Type" a corresponding descriptor key "Descr. Key" is included in the primary relation 8. The descriptor key indicates the related entry in the secondary relation 9 for the specific type of XML word. The columns "Type" and "Descr. Key" taken together are a secondary key, since they link each XML word specified by a primary key with the specific value.

The column "Level" of the primary relation 8 contains the hierarchical level of each XML word as shown in FIG. 3B. As can be seen, not all words of the descriptor 2 are stored in the relation. The "closing" words like "</title>" and "</section>" do not contain additional information and are not necessarily needed for recovery of the descriptor 2. They are, therefore, not stored in the database. It is, of course, possible to also store these words if necessary. A further column "Next Upper Word Pos." is included in the primary relation 8, which contains an indicator for the next upper hierarchical word of the XML word within the specific descriptor 2. This is a helpful information for recovering a descriptor part when only the word position of a portion of a common format is known, for example as a query result. A fast reconstruction of descriptor parts is facilitated by providing this additional information. For every word of the descriptor 2 the related namespace is included in an additional column "Namespace". This is necessary to ensure the correct definition of the metadata words. Of course, for the namespace declarations themselves no related namespace is included in the primary relation 8. The namespaces are stored at the end of the primary relation 8 (word position 14 and 15). The database in this example is realized such that when an XML document is entered into the database, all namespaces are first separately collected. When the whole document has been entered without the namespaces, only those namespaces, which are actually used for the document, are stored at the end of the relation 8. Upon reconstruction of the document this method is reversed. First the namespaces are read and only afterwards the XML document is reconstructed. Though the reconstructed XML document is not necessarily exactly identical with the initial XML document, it only comprises the actually used namespaces, which are listed at the beginning of the XML document. This leads to a better clarity and increased consistency.

Figure 5:
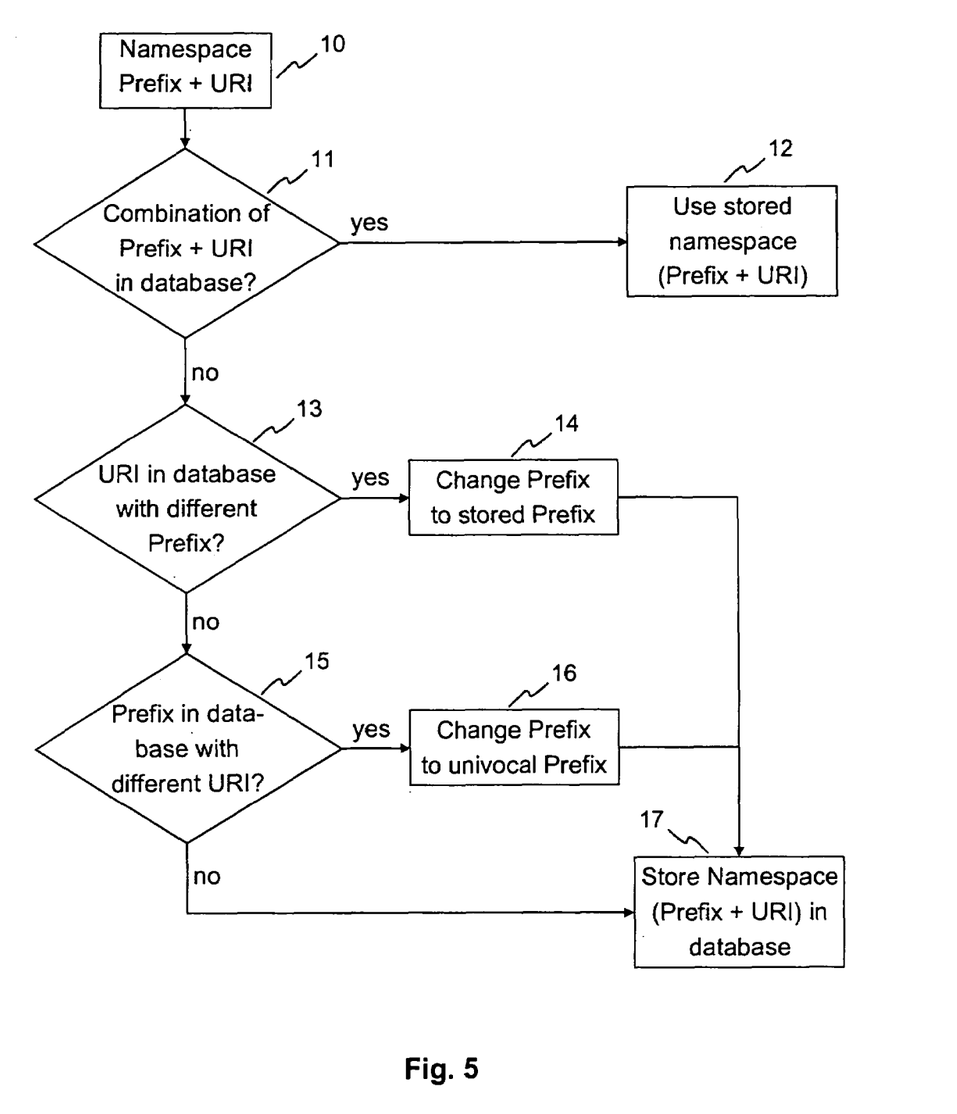
FIG. 5 shows a method according to the invention for ensuring data consistency upon mapping of the hierarchical data format to the relational database.

In FIG. 5 a method according to the invention for ensuring data consistency upon mapping of the hierarchical data format to the relational database is shown. In a step 10, the namespace consisting of a prefix and a uniform resource identifier is transmitted to the database. Before storing the prefix and the URI, in a step 11 it is checked whether the current combination of prefix and URI has already been stored in the database. If this is the case, in a step 12 the stored namespace, i.e. the prefix and the URI, is used for the data item. If, however, step 11 reveals that the current combination has not yet been stored in the database, in a step 14 it is checked whether the URI has previously been stored in the database with a different prefix. If this is the case, in a step 14 the current prefix is changed to the previously stored prefix. Afterwards, in a step 17, the data item and the namespace, i.e. the prefix and the URI, are stored in the database. In case step 13 reveals that the URI has not yet been stored in the database with a different prefix, in a step 15 it is checked whether the prefix has already been stored in the database with a different URI. If this is not the case, in step 17 the current combination of prefix and URI is stored in the database in addition to the data item. If, however, step 15 reveals that the current prefix has previously been stored in the database in combination with a different URI, in a step 16 the current prefix is changed to a univocal prefix. Again, in step 17 the data item and the combination of prefix and URI are stored in the database.

The following three examples shall further illustrate the method according to the invention.

1.) Suppose a first XML document is fed into the database:

<Section xmlns:mw="http://www.mw-homepage/mws-namespaces">

<mw:author>Winter et al.</mw:author>

</Section>

Afterwards a further XML document shall be fed into the database:

```
<Chapter xmlns:mw="http://www.mw-homepage/mws-
    namespaces">
    <mw:title>Namespaces</mw:title>
</Chapter<
```

Since this namespace has already been stored in the database no new namespace is fed into the database. Instead, the previously stored namespace is used again.

2.) Again the first XML document is fed into the database:

```
Section xmlns:mw="http://www.mw-homepage/mws-
    namespaces">
    <mw:author>Winter et al.</mw:authors>
</Section>
```

Afterwards the following XML document shall be fed into the database:

```
<Chapter xmlns:mmww="http://www.mw-homepage/mws-
    namespaces">
    <mmww:title>Namespaces</mmww:title>
</Chapter>
```

In this case the same URI is combined with a different prefix. To ensure data consistency within the database, i.e. to combine each URI with a single prefix, the current prefix is changed to the previously stored prefix before the data item is stored in the database:

```
<Chapter xmlns:mw="http://www.mw-homepage/mws-
    namespaces">
    <mw:title>Namespaces</mw:title>
</Chapter>
```

3.) Also in this example the first XML document is fed into the database:

```
<Section xmlns:mw="http://www.mw-homepage/mws-
    namespaces">
    <mw:author>Winter et al.</mw:authors
</Section>
```

Afterwards the following XML document shall be fed into the database:

```
<Chapter xmlns:mw="http://www.another-mw-homepage/
    XML/ns">
    <mw:title>Namespaces</mw:title>
</Chapter>
```

In this case the same prefix is used in combination with two different URI references. To ensure data consistency within the database, the current prefix is changed to a new, univocal prefix before the data item is stored in the database:

```
Chapter xmlns:mw2="http://www.another-mw-homepage/
    XML/ns">
    <mw2:title>Namespaces</mw2:title>
</Chapter>
```

What is claimed is:

1. A method for storing data in a database, comprising steps of:
   receiving a data item having a first identifier and a first locator;
   checking whether the first identifier has already been stored in the database with the first locator, and, if the first identifier has already been stored in the database with the first locator, linking the data item to the stored first identifier and the stored first locator;
   checking whether the first locator has already been stored in the database with a second identifier if the first identifier has not already been stored in the database with the first locator, and, if the first locator has already been stored in the database with the second identifier, linking the data item to the stored first locator and the stored second identifier;
   checking whether the first identifier has already been stored in the database with a second locator if the first locator has not already been stored in the database with the second identifier, and, if the first identifier has already been stored in the database with the second locator, storing a third identifier in the database with the first locator and linking the data item to the stored third identifier and the stored first locator; and
   storing the first identifier in the database with the first locator and linking the data item to the stored first identifier and the stored first locator, if the first identifier has not already been stored in the database with the second locator.

2. The method of claim 1, wherein the data item includes words of a hierarchical data format.

3. The method of claim 2, wherein the hierarchical data format is an extensible markup language.

4. The method of claim 1, wherein the combination of the first identifier and the first locator is a namespace declaration.

5. The method of claim 1, wherein the first locator is a uniform resource identifier.

6. The method of claim 1, wherein the first identifier is a prefix.

7. The method of claim 1, wherein the database is a relational database.

8. An apparatus for storing data in a database, the apparatus being operative to perform steps comprising:
   receiving a data item having a first identifier and a first locator;
   checking whether the first identifier has already been stored in the database with the first locator, and if the first identifier has already been stored in the database with the first locator, linking the data item to the stored first identifier and the stored first locator;
   checking whether the first locator has already been stored in the database with a second identifier if the first identifier has not already been stored in the database with the first locator, and, if the first locator has already been stored in the database with the second identifier, linking the data item to the stored first locator and the stored second identifier;
   checking whether the first identifier has already been stored in the database with a second locator if the first locator has not already been stored in the database with the second identifier, and, if the first identifier has already been stored in the database with the second locator, storing a third identifier in the database with the first locator and linking the data item to the stored third identifier and stored first locator; and
   storing the first identifier in the database with the first locator and linking the data item to the stored first identifier and the stored first locator, if the first identifier has not already been stored in the database with the second locator.

9. The apparatus of claim 8, wherein the data item includes words of a hierarchical data format.

10. The apparatus of claim 9, wherein the hierarchical data format is an extensible markup language.

11. The apparatus of claim 8, wherein the combination of the first identifier and the first locator is a namespace declaration.

12. The apparatus of claim 8, wherein the first locator is a uniform resource identifier.

13. The apparatus of claim 8, wherein the first identifier is a prefix.

14. The apparatus of claim 8, wherein the database is a relational database.

15. A method for storing data in a database, comprising steps of:

receiving a data item having a first identifier and a first locator;

checking whether the first identifier has already been stored in the database with the first locator, and, if the first identifier has already been stored in the database with the first locator, linking the data item to the stored first identifier and the stored first locator;

checking whether the first identifier has already been stored in the database with a second locator if the first identifier has not already been stored in the database with the first locator, and, if the first identifier has already been stored in the database with the second locator, storing a second identifier in the database with the first locator and linking the data item to the stored second identifier and the stored first locator;

checking whether the first locator has already been stored in the database with a third identifier if the first identifier has not already been stored in the database with the second locator, and, if the first locator has already been stored in the database with the third identifier, linking the data item to the stored first locator and the stored third identifier; and storing the first identifier in the database with the first locator and linking the data item to the stored first identifier and the stored first locator, if the first locator has not already been stored in the database with the third identifier.

16. The method of claim 15, wherein at least one of:

the data item includes words of a hierarchical data format;

the combination of the first identifier and the first locator is a namespace declaration;

the first locator is a uniform resource identifier;

the first identifier is a prefix; and the database is a relational database.

\* \* \* \* \*